United States Patent [19]

Wier, Jr.

[11] Patent Number: 4,481,170

[45] Date of Patent: * Nov. 6, 1984

[54] APPARATUS FOR TREATING STACK GASES

[76] Inventor: Alexander Wier, Jr., 8229 Billowvista Dr., Playa Del Rey, Calif. 90291

[*] Notice: The portion of the term of this patent subsequent to Apr. 6, 1993 has been disclaimed.

[21] Appl. No.: 42,915

[22] Filed: May 29, 1979

Related U.S. Application Data

[63] Continuation of Ser. No. 608,275, Aug. 27, 1975, abandoned, which is a continuation of Ser. No. 237,812, Mar. 24, 1972, Pat. No. 3,948,608.

[51] Int. Cl.³ .................. B01D 53/34; B01J 10/00; B01J 19/26
[52] U.S. Cl. .................. 422/168; 261/118; 422/170
[58] Field of Search .............. 422/168, 169, 170; 423/215.5, 235, 242; 261/21, 36 R, 118, 18 R (U.S. only); 55/DIG. 30

[56] References Cited

U.S. PATENT DOCUMENTS

| | | | |
|---|---|---|---|
| 879,149 | 2/1908 | Cunningham | 261/118 |
| 1,908,782 | 5/1933 | Pearce | 422/170 X |
| 1,985,010 | 12/1934 | Berkhuijsen | 261/36 R UX |
| 2,215,707 | 9/1940 | Matanovich-Manov et al. | 261/118 X |
| 2,833,528 | 5/1958 | Schroeder | 261/21 |
| 3,119,675 | 1/1964 | Gallagher | 261/118 X |
| 3,522,000 | 7/1970 | Kinney | 423/242 |
| 3,616,597 | 11/1971 | Stewart | 55/91 |
| 3,758,081 | 9/1973 | Prudhon | 261/118 X |
| 3,763,634 | 10/1973 | Alliger | 261/118 x |

Primary Examiner—Bradley Garris
Attorney, Agent, or Firm—Lyon & Lyon

[57] ABSTRACT

Stack gases containing sulfur dioxide and other pollutant gases and particulate matter are passed through a horizontally extending chamber wherein the stack gases are sprayed by a liquid reagent. The liquid spray droplets move across the cross-sectional flow area of the stack gases and scrub the stack gases thereby removing a substantial portion of the pollutant gases and particulate matter therefrom. The resultant liquid slurry which might otherwise collect in the chamber is washed therefrom by the spray and drains downwardly from the chamber for discharge thereby preventing plugging of the chamber.

12 Claims, 3 Drawing Figures

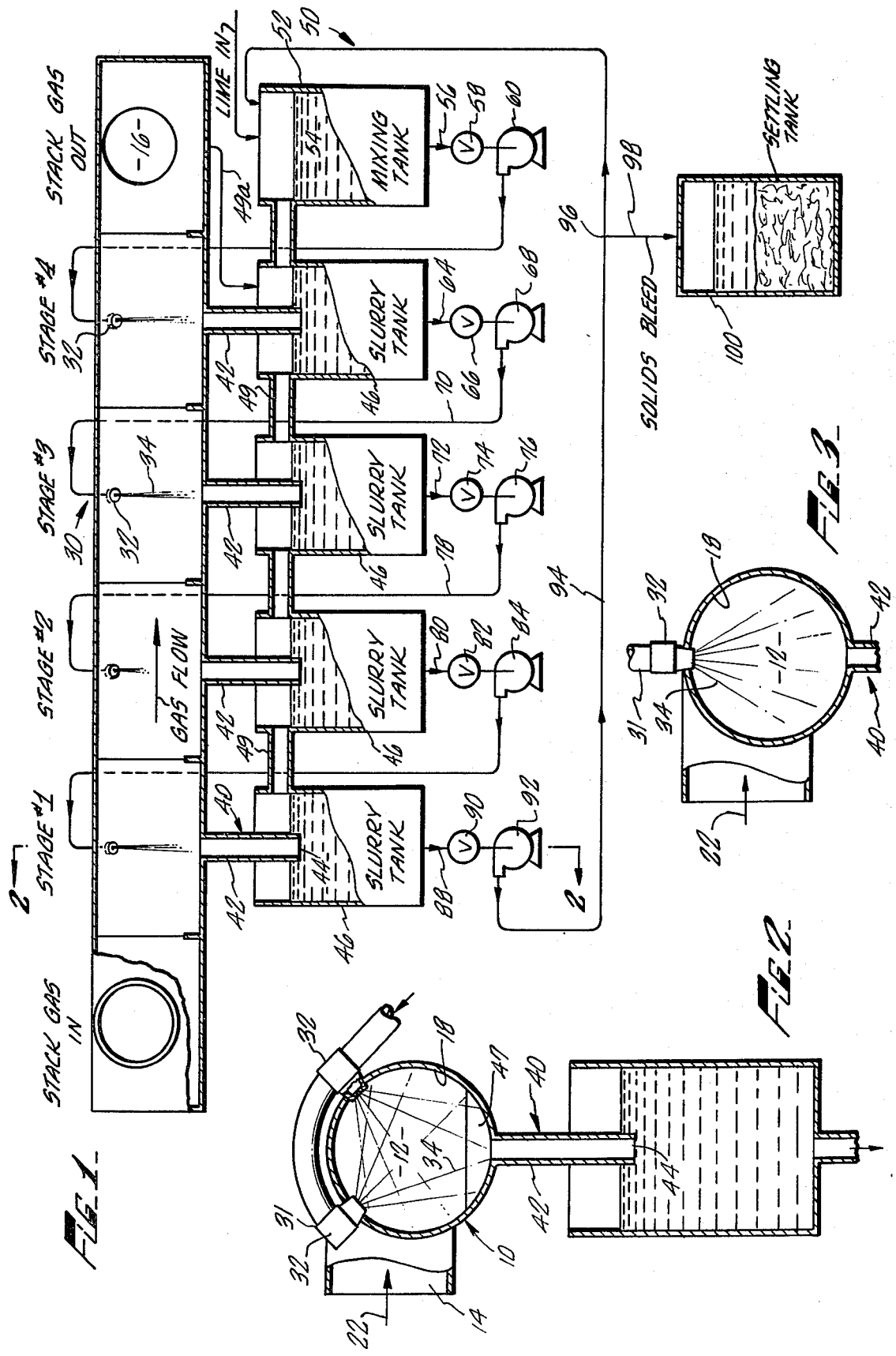

APPARATUS FOR TREATING STACK GASES

This is a continuation of application Ser. No. 608,275, filed Aug. 27, 1975, now abandoned, which is a continuation of Ser. No. 237,812, filed on Mar. 24, 1972 now U.S. Pat. No. 3,948,608.

This invention relates to a method and apparatus for treating plant exhaust gases or so-called stack gases and more particularly relates to a method and apparatus for wet scrubbing stack gases and thereby removing pollutants contained therein.

Stack gases generate various particulate and gaseous matter which contribute to air pollution. Of particular concern are the relatively heavy concentrations of sulfur dioxide found in stack gases created by plants and power generating stations burning fossil fuel. The use of low sulfur fuels would substantially reduce the amount of sulfur dioxide emitted, but the supply of such fuels is limited. Moreover, these stack gases also contain other objectionable pollutants including oxides of nitrogen, dust and trace amounts of other materials such as vanadium and mercury. Therefore, there is a present need for a system which will affectively reduce sulfur dioxide emissons and which is capable of controlling other pollutants being emitted.

Several methods and systems have been used in the past, but the effectiveness of each is limited. Hot or cold electrostatic precipitators, bag or filter houses, and mechanical precipitators such as cyclone separators are substantially limited to the removal of particulate matter. Scrubbers, particularly wet scrubbers, provide the most effective means for control of both particulate and gaseous pollutants. Various efforts directed to the specific problem of sulfur dioxide emissions have also been attempted. These efforts include removal by oxidation of the sulfur dioxide to sulfur trioxide using a catalyst, by absorption on a bed of activated carbon or similar material, by reaction with dry chemicals such as calcium oxide formed by injection of limestone in the furnace or other chemicals such as magnesium oxide, and by wet scrubbing with a variety of chemicals and scrubber types. Chemicals which have been used include the carbonates and hydroxides of sodium, calcium or magnesium, ammonia and ammonium hydroxide, organic amines such as diethanolamine, and other chemicals. The preferred chemical is calcium oxide or calcium hydroxide because of its reactivity and cost. However, the wet scrubbers heretofore used and particularly those including a calcium hydroxide or lime scrubbing liquid to effect removal of sulfur dioxide, are inherent with various problems.

The conventional wet scrubbers typically employ a vertical tower construction. Included within the wet scrubbers previously used in some form of restriction of the cross-sectional flow area of the stack gases, normally either a bed of material or venturi structure. This restriction in the flow path through the scrubber necessarily results in an increased pressure drop as the stack gases move through the scrubber which in turn can be detrimental to the operating efficiency of the plant. To avoid the problems associated with this pressure drop, it is conventional to use several fans or other means requiring auxiliary power to assist the flow of stack gases through the scrubber.

The bed type scrubbers generally include either a packed bed of material, such as marble, or a mobile bed of material, with a spray of reagent scrubbing liquor in the tower creating droplets which move downwardly against the direction of gas flow or counter-current thereto and onto the bed of material. In either instance, these beds present a geometric configuration on which particulate matter collects to at least partially plug the scrubber and thereby increase the pressure drop thereacross.

This problem of plugging is particularly severe in those scrubber systems adapted to remove sulfur dioxide from the stack gases with a lime or calcium hydroxide reagent. The product of the reaction of lime and sulfur dioxide is calcium sulfite/bisulfite which frequently oxidizes to calcium sulfate commonly known as gypsum or plaster of paris. This plaster of paris when mixed with the fly ash in the stack gases and allowed to set up forms a concretelike substance which will clog and plug the system to such an extent that frequent and extended shut downs of the entire scrubber will be required for removal of this substance.

The plugging problem associated with these bed type wet scrubbers adapted to control the emission of sulfur dioxide has been partially solved by using a less reactive reagent, such as limestone, which thus permits removal of the collected sulfur dioxide before it reacts. However, this change to a less reactive reagent reduces the pollutant removal effectiveness of the system and in addition has created several new problems. For example, the limestone slurries are abrasive and cause erosion of the pumps and spray nozzles used in the system. Moreover, an external reaction tank or holding tank of substantial size is required because of the extended reaction time. Also, limestone is not readily available in certain areas and when shipping of the limestone is necessary it becomes less economical to use than a lime reagent which, in comparable amounts required for use in the scrubber systems, can be shipped at a significantly lower cost.

Aside from the increased pressure drop and general interference with the operation of the system caused by the plugging of the bed, there are other disadvantages associated generally with the vertical tower wet scrubbers wherein the scrubbing liquor droplets move counter-current to the stack gas flow. This counter-current flow factor alone probably contributes to slight increase in the pressure drop. However, as the size of this type wet scrubber increases the nature of the enlarged vertical tower structure will result in further increases in the pressure drop if the pollutant control or collection efficiency of the scrubber is to be maintained or increased. This pollutant control or collection efficiency, if expressed in the logarithmic ratio of inlet concentration to outlet concentration of pollutant matter is:

$$\log_e(C_i/C_o) = K(L/G)(E/r)(Z)(v_t/v_d)$$

wherein;
$C_i$ = inlet concentration
$C_o$ = outlet concentration
$K$ = a numberical constant containing unit conversion factors
$L/G$ = ratio of liquid to gas flow
$E/r$ = droplet efficiency fraction divided by the radius of the droplet
$Z$ = height of tower
$v_t/v_d$ = velocity ratio of the settling velocity to the velocity of the droplet relative to the duct or tower wall.

Thus it can be seen that for vertical tower countercurrent wet scrubber an increase in the height and a decrease in the diameter (because of the velocity ratio term) results in a higher logarithmic ratio of the inlet to the outlet concentration. To the stack gas flow this means, however, that increasing the collection efficiency will result in an increase in the gas pressure drop of the scrubber.

The vertical tower counter flow systems also require a rather sophisticated control arrangement to maintain a proper ratio of scrubbing liquid flow to stack gas flow. That is, the removal of the scrubbing liquid in this type scrubber is partially dependent on the stack gas flow and reduction of the gas flow could result in a flooding of the scrubber if unaccompanied by an appropriate reduction in the flow of the scrubbing liquid sprayed into the tower.

In addition, a vertical construction of the tower when enlarged requires an increase in the thickness of the wall material and thus additional construction costs in order to satisfy the new structural demands. Lastly, the vertical tower construction is rather undesireable from an aesthetic standpoint due to its impact on the skyline.

The venturi type wet scrubbers are generally less effective in removing pollutants from the stack gases than the bed type wet scrubber. Moreover, greater pressure drops are often associated with these type scrubbers. In the venturi type scrubber the contaminated stack gas enters the venturi and is accelerated to a high velocity at the throat where it impinges upon a scrubbing liquid spray generally flowing in the direction of the gas flow or co-current thereto. This results in the atomization of the liquid. The high differential velocity between the gas and atomized droplets promotes impaction of the particles with the fine droplets. As the gas decelerates, further impaction and agglomeration of the droplet take place. After the pollutants have been trapped within the droplets, the resulting agglomerates are removed from the gas stream in a separator. The scrubbed gas enters the separator tangentially, spinning the liquid droplets against the wall and leaving at the upper part of the unit. The pollutant laden liquid drains by gravity to the bottom of the tower as the stack gas progresses upwardly. As indicated previously, the restriction created by the venturi in the stack gas flow path results in a significant pressure drop across the scrubber. Moreover, increased pollutant collection efficiency in this type scrubber is generally dependent on increased velocity at the throat thereby necessitating an even greater pressure drop.

Therefore, it is a primary object of the present invention to provide a wet scrubbing method and apparatus which will effectively remove sulfur dioxide and other pollutants from stack gases with a minimal increase in pressure drop.

It is another object of the present invention to provide a method and apparatus for wet scrubbing stack gases which utilizes a highly reactive and substantially non-abrasive reagent, such as a lime solution, while avoiding the plugging problems typically associated with such reagents.

Moreover, with regard to both the bed type and the venturi type wet scrubber heretofore used, they are both substantially limited by the nature of their operation to a single type reagent within a particular unit. This is considered significant because different reagents are more effective in removing certain pollutants. That is, if a series of different reagents could be used in a single scrubber unit a more efficient removal of nitrogen oxides and other trace elements contained within the stack gases might be effected. Therefore, still another object of the present invention is to provide a wet scrubbing method and apparatus wherein various reagents can be employed in stages within a single unit to effect removal of different pollutants.

In accordance with these and other objects, the present invention briefly includes an unrestricted horizontally extending chamber through which the stack gases flow. One or more reagents, including generally a lime solution for removal of sulfur dioxide, are sprayed, preferably at various stages, into the chamber with the liquid droplets therefrom moving across the path of flow of the stack gases. The pollutant laden liquid is washed from the chamber by the spray and discharges therefrom to be recycled, sewered or reclaimed.

Still another object of this invention is to provide a wet scrubbing method and apparatus which is relatively low in cost.

A still further object of this invention is to provide a method and apparatus for wet scrubbing stack gases wherein pollutant collection efficiency is maintained or increased at large volumes of gas flow while still maintaining a minimum pressure drop across the scrubber.

These and other objects and advantages of the present invention will be made readily apparent from the following detailed description and accompanying drawings, wherein:

FIG. 1 is diagramatic side view of the present invention illustrating the horizontally extending wet scrubber chamber provided with a multiplicity of stages.

FIG. 2 is a sectional end view taken substantially along the lines 2—2 of FIG. 1 and illustrating a preferred arrangment of the scrubbing liquid spray nozzles in the horizontal chamber.

FIG. 3 is a sectional end view similar to FIG. 2 illustrating another arrangement of the spray nozzles.

Referring now in detail to the drawings, the wet scrubbing apparatus, generally designated 10, and the various steps associated with the wet scrubbing process of the present invention are diagrammatically illustrated by FIG. 1 of the drawings. The scrubbing apparatus includes a horizontally extending and preferably cylindrical chamber 12 with a stack gas inlet 14 at one end thereof and a stack gas outlet 16 at the other end. As indicated by the drawings, the horizontally extending cylindrial chamber 12 provides a uniform unrestricted cross-sectional flow area throughout its length. The importance of this feature will become readily apparent from the following discussion.

The stack gases or plant exhaust gases enter the horizontally extending cylindrical chamber 12 at 14 preferably perpendicular to the direction of the path of gas flow defined by the inner cylindrical sidewall surface 18 of the chamber and indicated by the directional arrow 20. This necessitates a change in the direction of the stack gas flow after it enters the chamber 12 and effects a partial inertial separation of the particulate matter contained within the stack gases at the inlet end 14. As seen best in FIG. 2, the center axis of the inlet is offset with respect to the center axis of the chamber 12 whereby at least a portion of the entering stack gases flowing in the direction indicated by the directional arrows 22 enter tangentially with respect to the inner cylindrical sidewall 18. This creates a swirling or spinning action of the stack gases as they flow through the horizontal chamber 12 effecting further inertial separation of particulate matter and droplets from the stack gases flowing though the chamber 12. After the stack gases have progressed the length of the chamber 12, they exit the chamber through the outlet 16 which is also preferably perpendicular to the direction of gas flow in the chamber thereby effecting still another directional change of the stack gas flow and further inertial separation of particulate matter contained within the stack gases before exiting the chamber 12.

Spraying means, genrally designated 30, include a plurality of spring elements 31 which spray a scrubbing liquid into the chamber 12 thereby causing liquid droplets therefrom to cover substantially the entire cross-sectional area of stack gas flow in the chamber at various stages along length thereof. As shown in FIG. 1, each spray element 31 includes one or more spray nozzles 32 at the various stages along the chamber 12. Four stages are shown, but it should be recognized that the present invention is not limited to any particular number of stages. However, it is felt that the use of more than one spraying stage will reduce the flow rate of scrubbing liquid required through the scrubber system to effect a particular pollutant collection or control rate. However, a plurality of spraying stages is considered particularly desirable where the stack gases enter the scrubbing chamber at a relatively high temperature.

Preferably, as shown in FIG. 2, a pair of nozzles 32 are located at each stage on the upper side of the cylindrical sidewall 18 with one nozzle spaced about 45° from each side of the vertical center line of the chamber 12. It has been found that this particular positioning of the nozzles 32 at each stage provides for a substantially complete curtain or sheet of liquid droplets across the cross-sectional area of flow of the stack gases in the chamber. However, more or less nozzles at each stage or at a particular stage along the chamber 12 may be preferable in certain instances. FIG. 3 represents a modified embodiment of the present invention wherein only a single nozzle 32 is employed at one or more stages. When a single nozzle 32 is used it is generally preferable to locate this nozzle at the top of the inner cylindrical sidewall 18 along the vertical center line of the chamber. It should be noted in either instance, the nozzles 32 preferably direct a relatively narrow sheet of spray, as indicated by the phantom lines 34, across the chamber 12 substantially perpendicular to or cross-current to the flow of gas therein. While the cross-current flow of the spray is generally desirable because it avoids interference with the spray at other stages, there may be instances where it would be preferable to adjust the direction of the spray in the chamber. For example, at relatively high volumes of gas flow it may be desirable to adjust the spray to a direction partly counter-current to the direction of stack gas flow to minimize the so-called problem of mist carryover wherein the spray droplets are carried out of the scrubber chamber by the stack gases. This is a problem often associated with the venturi type scrubbers wherein the spray is co-current to the gas flow.

An important feature of the present invention involves a self-washing action. A relatively large volume of scrubbing liquid is sprayed by the nozzle or nozzles at each stage with the liquid droplets emitted therefrom moving across the chamber 12 and eventually impinging on the sidewall 18. As the droplets of liquid move across the chamber 12 they create the scrubbing action of the stack gases passing therethrough by absorbing pollutant matter contained therein. This combination of pollutant matter and liquid reagent produces a liquid slurry which, because the sidewall 18 is cylindrical and due to the influence of gravity, naturally tends to drain downwardly to the bottom of the sidewall. However, any of this liquid slurry which might otherwise collect on the sidewall is removed therefrom not only because of the gravitational drainage, but because of the washing action created by the subsequent impinging spray droplets.

Drainage means, generally designated 40, extend downwardly from the horizontal chamber 12 to remove therefrom the liquid slurry drained and washed to the bottom of the chamber. Preferably, the drainage means comprises a discharge pipe 42 at each stage of the chamber and axially positioned along the length thereof generally opposite the spray element 31. Each discharge pipe communicates the liquid slurry from the chamber 12 through a lower open end 44 thereof into an open tank 46, commonly referred to as a slurry tank. The discharge pipes or conduits are not absolutely necessary, but they are preferable because they tend to preclude splashing. As shown in FIGS. 1 and 2, vertically extending weirs 47 in the bottom of the chamber 12 separate each stage. Again it should be noted that such weirs are not necessary and may be deleted in certain instances. However, such weirs 47 do tend to control the relatively high volume of liquid flow within the chamber. When the present invention comprises a plurality of stages, such as shown in FIG. 1, it is generally preferable to provide separate slurry tanks 46 for each discharge pipe 42. An overflow line 49 preferably interconnects these various tanks whereby a more sophisticated control of the required pumps is avoided as will also be made apparent from the following discussion. In addition, there is also a discharge line or conduit 49a at the outlet end 16 of the scrubbing chamber 12 which communicates material therefrom to a slurry tank 40.

Although a plurality of stages are shown, it should be recognized that in the particular embodiment of the invention illustrated, these stages are all part of a closed cycle for a single reagent. The following represents a discussion of this particular cycle, but thereafter, it will also be shown that the present invention could readily comprise a single unit with several different reagent cycles. Referring now in detail to the particular reagent cycle illustrated in FIG. 1, it should be noted that the reagent, in this particular instance, lime, is introduced into the cycle, generally designated 50, at a mixing tank 52. Here the lime is put into solution or slurry to form a scrubbing liquor 54. This scrubbing liquor 54 generally comprises calcium hydroxide or hydrated lime. This scrubbing liquor 54 is communicated by conduit means 56 through a check valve 58 to a pump 60. The pump 60 communicates the scrubbing liquor through conduit means 62 to the spray element 31 or in this particular instance, the pair of nozzles 32 at stage 4 of the scrubbing chamber 12. Stage 4 is generally adjacent the downstream outlet end 16 of the scrubbing chamber. The scrubbing liquor at stage 4 is sprayed by the nozzle 32 in a sheet across the chamber 12 and thus through the path of any stack gases flowing therein. As the spray droplets of calcium hydroxide move across the stack gases progressing through stage 4 of the chamber, they provide the so-called scrubbing action wherein they absorb particulate matter contained within the stack gases and also absorb certain of the pollutant gases and react chemically therewith.

In this particular instance, the calcium hydroxide scrubbing liquor reacts readily with the sulfur dioxide in the stack gases to produce calcium sulfite/bisulfite which then oxidizes to calcium sulfate, commonly known as gypsum or plaster of paris. This product of the reaction of the lime scrubbing liquor and sulfur dioxide together with the particulate matter, such as fly ash, collected by the spray droplets, forms the liquid slurry. This slurry if allowed to set up forms a concrete-like substance which clogs and plugs the bed type wet scrubbers. However, in the wet scrubber of the present invention, this slurry on the cylindrical sidewall 18 of the chamber is washed therefrom by subsequent impinging droplets from the continuing spray and drains along the cylindrical sidewall 18 to the bottom of the chamber where it discharges through the discharge conduit 42 in communication with stage 4 of the chamber.

The discharge line 42 communicates the slurry to a slurry tank 46. This slurry from stage 4 is then communicated from the slurry tank by conduit means 64 through check valve 66 to a pump 68. This liquid slurry which still contains a substantial amoount of unreacted calcium hydroxide is communicated by the pump 68 under pressure through conduit means 70 to the nozzles 32 of stage 3. These nozzles 32 spray this slurry liquid across stage 3 of the chamber and through the stack gases flowing therethrough to collect additional particulate matter and pollutant gases for reaction with the calcium hydroxide. The resulting slurry formed thereby is washed and drained from stage 3 of the chamber through a discharge conduit 42 in the same manner as described with respect to stage 4.

After discharge into a slurry tank 46, the slurry is communicated by conduit means 72 through a check valve 74 to the pump 76. Thereafter, pump 76 communicates the slurry liquid under pressure through conduit means 78 to the nozzles 32 of stage 2 wherein the scrubbing, washing, and discharge steps are repeated. The slurry from stage 2 is discharged into a slurry tank 46 and then communicated by conduit means through check valve 82 to the pump 84. The pump 84 then communicates the slurry of stage 2 under pressure through conduit means 86 to the nozzles 32 of the upstream stage 1 which is generally adjacent the inlet end 14 of the scrubbing chamber. Again, the slurry is sprayed across the chamber at stage 1 and again the steps of scrubbing of the stack gases passing therethrough, washing of the resultant slurry from the chamber and subsequent discharge into a slurry tank 46 are repeated. The slurry from stage 1 is communicated from the slurry tank 46 by conduit means 88 though check valve 90 to pump 92. Thereafter, this slurry is pumped through a re-cycling line 94. Within the re-cycling line 94 at 96, conventional means, such as a centifuge, filter, or clarifier, are provided to separate solids contained within this slurry. The separated solids are thereafter discharged by conduit means 96 to a settling tank 100 for subsequent collection and disposal while the liquid continues through the re-cycling line 94 into the mixing tank 54 for repeated spraying at the various stages into the scrubbing chamber 12.

Although not shown, control means are provided within the cycle 50, preferably in communication with the liquid slurry discharged from stage 1, which adjusts the pH of the lime scrubbing liquor to maintain a predetermined stoichiometric ratio with respect to the calcium hydroxide-sulfur dioxide reaction. It has been found that a stoichiometric ratio lime solution in a range between 1.0 and 2.0 and preferably about 1.5 for a liquid flow rate at each stage between about 10–50 (GPM) and a gas flow rate of about 1000 (CFM), wherein the lime scrubbing liquid discharged from the upstream stage is slightly acidic (pH between about 6.0 and 7.0 and preferably about 6.5), is particularly effective for the removal of the sulfur dioxide from the stack gases.

Briefly summarizing the process of the cycle heretofore described, it should be noted that the stack gases after entering the scrubbing chamber 12, pass horizontally therethrough in a swirling motion toward the outlet end 16. At the four stages along the chamber, a scrubbing liquor, comprising calcium hydroxide, is sprayed in a sheet through the path of stack gas flow thereby scrubbing the stack gases for removal of the particulate and gaseous pollutants contained therein. As indicated previously, the spray droplets of scrubbing liquor absorb pollutants and react chemically with certain of the pollutants. The principle reaction involves the reaction of the calcium hydroxide with the sulfur dioxide contained within the stack gases to produce calcium sulfite/bisulfite, but it is also felt that there is at least a partial reaction involving the nitrogen oxides contained with the stack gases. The combination of the scrubbing liquor with the pollutants produces a liquid slurry which is washed by the spray and drained downwardly on the cylindrical sidewall 18 to the bottom of the scrubbing chamber 12. The slurry is then discharged from the chamber 12 into a slurry tank and thereafter pumped for spraying at another stage until it reaches the slurry tank associated with stage 1 at the inlet end of the scrubbing chamber. From this slurry tank 46 the liquid slurry is re-cycled back to the mixing tank 54 after solids have been bled therefrom into a settling tank. During the process, the stoichiometric ratio is maintained at a predetermined level to provide the most effective lime scrubbing liquor.

As indicated previously the lime reagent is generally preferred for wet scrubbing stack gases including heavy concentrations of sulfur dioxide. However, the present invention is not intended to be restricted to this particular reagent and any reagent which will react with or absorb the pollutant in the gas which is being scrubbed, including brackish water and a limestone slurry, could also be used in the above described cycle 50.

The following specific example of this above described cycle is submitted merely to illustrate the present invention and is not intended to limit it. Exhaust gas from a low sulfur coal-fired furnace or a furnace fired with a mixture of natural gas and coal containing water either resulting from the combustion of natural gas or from feeding a wet slurry of coal into the furnace or both is passed through an air preheater. It should be recognized that the exhaust gas will be diluted somewhat with air leakage. This exhaust gas is then passed through an electrostatic precipitator which will remove most of the suspended fly ash. This gas, hereafter called the scrubber inlet gas, is at a temperature of 225° F. and an absolute pressure of 29.4 in Hg. abs. and contains about 400 ppm $SO_2$ and 0.0125 gr/SCF of suspended fly ash (ranging in particle size from 0.2 to 10 microns in diameter). The composition of this suspended fly ash is about 53% $SiO_2$, 21% $Al_2O_3$, 6% $Fe_2O_3$, with the remaining 20% by weight being oxides of other metals in smaller amounts.

Each minute 68.08414 pounds of this gas enters the scrubber containing 0.00152 lbs. of suspended fly ash (i.e. 0.0125 gr/SCF) and 0.06053 lbs. of $SO_2$ (i.e. 400 ppm by volume) and 10.402 lbs. of $CO_2$, 5/675 lbs. of $O_2$, 4.895 lbs. of $H_2O$, 47.009 lbs. of $N_2$, 0.03511 lbs. of NO and 0.00598 lbs. of $NO_2$. At each stage the liquid reagent is sprayed into the cylindrical scrubber chamber at a rate of 37.5 GPM. Thus, the above amount of gas as it first progresses through the scrubber chamber contacts 37.5 gallons of an aqueous lime solution (whose pH is adjusted to 6.5 leaving the scrubber) sprayed through a nozzle at an inlet pressure of 10 psi gage. The gas is contacted a second time with 37.5 gallons per minute of the aqueous lime solution, then a third time with 37.5 GPM of lime solution, and inally in the 4th stage, 37.5 GPM of the lime solution.

The pressure drop of the gas through the scrubber is 0.2 inches of water and its temperature at the outlet is 120° F. 68.66027 lbs. per minute of the gas leaves the scrubber at a flow rate of about 1,000 cu. ft./min. (the diameter of the circular scrubber is about 22 inches) and thus each minute leaving the scrubber there are 0.00042 lbs. of suspended fly ash particles (whose diameter is smaller than 0.3 microns) i.e. 0.0034 gr./SCF. 0.00276 lbs of $SO_2$, i.e. 18 ppm (by vol) as well as 10.402 lbs. of $CO_2$, 5.675 lbs. of $O_2$, 5.530 lbs. of $H_2O$, 47.009 lbs. of $N_2$, 0.03511 lbs. of NO and 0.00598 lbs. of $NO_2$.

Thus it can be seen that 0.635 lbs/minute of $H_2O$ is absorbed by the gas and 0.05777 lbs/minute of $SO_2$ and 0.00110 lbs/minute of fly ash are contained in the scrubbing liquid.

Preliminary data indicates that substantially none of the $CO_2$, $O_2$ or $N_2$ are removed with this scrubbing liquor. The solubility of $N_2$ is so slight that the amount dissolved is negligible compared to the quantity of $N_2$ in the gas. The solubility of $O_2$ is also slight, but some amount of $O_2$ reacts with the calcium sulfite in the scrubbing liquor to form calcium sulfate. However, the maximum amount that this would be is about 0.0144 lbs/minute, which is small compared to the 5.675 lbs/minute of $O_2$ in the gas so that the overall percentage of $O_2$ in the gas is not changed appreciably. It is also felt that some portion of the 0.00598 lbs/minute of $NO_2$ is absorbed by the scrubbing liquor. Absorption or desorption of $CO_2$ occurs in the scrubbing liquor depending upon the pH of the scrubbing liquor but a buffer zone exists in the pH region found to be optimum for $SO_2$ removal (i.e. pH-6.5) and hence no appreciable change in the $CO_2$ content of the gas occurs. Thus, it can be seen that four stages of scrubbing at an L/G of 37.5 GPM/1000 CFM result in the lowering of the $SO_2$ content of the gas from 400 ppm to 18 ppm with the dust loading being decreased from 0.0125 gr/SCF to 0.0034 gr/SCF.

The liquid slurry leaving the scrubber at each stage is collected in a 50 gallon tank so that a holding time of 45 seconds is realized between each stage. The pH of the liquid leaving the first stage is measured to be 6.5 in this tank. After the average holding time of 45 seconds, 98% of this 37.5 GPM of liquid (i.e. 36.75 GPM) is pumped to a mixing tank where sufficient lime is added so that the pH in the first stage tank is maintained at 6.5. It has been found that stoichiometric quantities (i.e. about 0.051 lbs/minute of CaO) are sufficient. At this time, sufficient water is added, about 6.864 lbs/minute, to compensate for the bleed-off (6.2 lbs/min), the liquid solution including the water added to the gas (0.635 lbs/min) and the water removed with the calcium sulfite/sulfate mixture (about 0.029 lbs/min). This is then pumped at 37.5 GPM from the mixing tank to the 4th stage nozzles. Leaving this stage, the liquid passes into the 50 gallon vertical tank below this stage. The liquid from this tank is then pumped at a rate of 37.5 GPM to the nozzles of the second stage. Leaving this stage, it drains into the vertical tank below the 2nd gas stage. The liquid from this tank is then pumped at a rate of 37.5 GPM into the nozzles of the first stage. It draws from this stage into the vertical tank below this stage where the pH is measured to be 6.5 as previously described.

The process thus operates in a continuous fashion with 37.5 gallons of liquid passing through the scrubber each minute, through four stages in a countercurrent manner with 36.75 gallons being re-cycled and 0.75 gallons per minute being bled off which contains 73% of the fly ash entering the scrubber in the scrubber inlet gas and 95.5% of the $SO_2$ in the form of calcium sulfite and sulfate.

This solid material (predominantly $CaSO_4$) is then separated from the liquid in a conventional manner and the remaining liquor is returned to the mixing tank along with the necessary make up water so that 37.5 GPM of liquor can be circulated. The amount of this solid material would be about 0.0011 lb/min of fly ash and 0.125 lb/min as $CaSO_4$. Water of hydration 0.029 lb/min as well as that included in the sludge (20%) would also be an additional amount so that about 0.18 lb/min of sludge would be leaving the system.

Thus, in summary, very low absolute levels of $SO_2$ (18 ppm) and fly ash (0.0034 gr/SCF) were obtained utilizing this invention with a gas pressure drop of 0.2 inches of water and an L/G per stage for four stages of 37.5 GPM/1000 CFM. Plugging of the gas passage or the liquid lines did not occur after a six month testing period.

As indicated previously, the present invention is not intended to be limited to a particular reagent or to a single reagent cycle. With minor modifications of the apparatus and without deviating from the scope of the invention, it is readily apparent that the scrubbing chamber could be extended to incorporate one or more stages of other reagents. These reagents would be added through a separate cycle similar to the lime solution cycle discussed above. That is, the cycle would include a separate mixing tank and one or more slurry tanks depending on the number of stages used. As before, the reagent would be pumped from the mixing tank or a slurry tank to the nozzle or nozzles at a stage and sprayed across the the chamber and thus across the flow path of the stack gases. This would initiate at that stage the scrubbing, washing, and discharging steps in substantially the same manner as heretofore described. Preferably, the liquid slurry discharged from the upstream stage would be re-cycled to the mixing tank after solids were bled therefrom. It should be noted that the horizontal cross-flow scrubber is particularly adapted for such a multi-reagent process because there would be no interference or mixing of the reagent sprays as there would be in vertical tower scrubber and because plugging is eliminated, various reagents can be used.

It is felt that such a multi-reagent process and apparatus for carrying out such a process would be particularly useful where it is desired to remove both $SO_2$ and NO from the stack gases. In this instance, a lime solution reagent in one cycle would be employed for the removal of $SO_2$ and the use of such chemicals as $H_2O_2$ or $KMnO_4$ in another cycle would be used for the removal of $NO_x$. This is due to the oxidation of NO to $NO_2$ with chemicals such as $H_2O_2$ or $KMnO_4$ and then the subsequent absorption of $NO_2$ with water and its removal.

Thus, with the multi-stage, separate reagent cycle arrangement in the horizontal cross-flow scrubber of the present invention, it is possible to remove the particulate matter in earlier stages, remove the $SO_2$ in the next stages and remove the oxides of nitrogen in the latter stages. It is also possible that scrubbing with a basic solution followed by scrubbing with an acidic solution will result in removal of trace amounts of elements which otherwise would be emitted with the stack gases.

Of particular note with respect to the present invention as described above, is the substantially unrestricted scrubbing chamber through which the stack gases flow. That is, the stack gases flow substantially uninterrupted through the scrubbing chamber except for the spray of scrubbing liquor. As shown by the above example, the present invention provides for a significantly high removal of pollutants from the stack gases, but the pressure drop occuring during the scrubbing operation is substantially minimized because of the unrestricted flow through the scrubbing chamber. Moreover, it can be shown that pollutant removal is maintained or in some instances increased in a system for handling increased volumes of stack gas flow without increasing the pressure drop. Referring now to the pollutant control efficiency for this system, if expressed in the logarithmic ratio of inlet concentration to outlet concentration of pollutant matter, it is:

$$\log_e(C_i/C_o) = K\,(L/G)\,(E/r)\,(D)$$

wherein;
$C_i$ = inlet concentration
$C_o$ = outlet concentration
$K$ = a numerical constant containing unit conversion factors
$L/G$ = ratio of liquid to gas flow
$E/r$ = droplet efficiency fraction divided by the radius of the droplet
$D$ = Diameter of the scrubbing chamber or duct.

Thus, to increase the collection efficiency the diameter of the scrubbing chamber should be increased assuming that all of the other factors remain the same. However, increasing the diameter of the scrubbing chamber would also decrease the pressure drop of the stack gas so that for the same collection efficiency the wet scrubber of the present invention would have a lower pressure drop. This is in direct contrast to the heretofore used wet scrubbers where an increase in pollutant collection efficiency represented a similar increase in pressure drop.

Of similar importance is the self-discharging or washing aspects of the present invention. This is particularly important when a lime reagent is used for the removal of sulfur dioxide from the stack gases since the resulting product if allowed to set up forms a concrete-like substance which would clog and plug the scrubber. However, because the slurry is washed and removed from the scrubber chamber, there is insufficient time for such set up and thus plugging is avoided. Moreover, the rate at which the liquids are pumped through the cycle avoids a premature set up within the slurry tanks.

Other advantages of the present invention to be noted with respect to its use of a calcium hydroxide scrubbing liquor for the removal of sulfur dioxide, aside from the lack of plugging, include efficient pollutant control by maintaining a particular stoichiometric ratio, reducing equipment fatigue associated with the use of an abrasive liquor, and solving an air pollution problem without creating a water pollution problem. This latter advantage is achieved because of the by-product material produced as a result of the calcium hydroxide and sulfur dioxide reaction is in solid form which is in contrast to the by-products produced when soluble reagents such as sodium compounds are used.

The horizontal cross-flow scrubber of the present invention also permits the use of several reagents in a single unit. In addition, the horizontal structure provides for lower construction costs since it is not necessary to support its own weight in the manner of a vertical structure and provides for a system which is less objectionable from an aesthetic standpoint.

Having fully described my invention, it is to be understood that I do not wish to be limited to the details herein set forth, but my invention is of the full scope of the appended claims.

I claim:

1. An apparatus for wet scrubbing stack gases to remove therefrom pollutants including gaseous pollutants such as oxides of sulfur and nitrogen, comprising:
   (a) a pollutant removal chamber consisting of a substantially horizontally extending flow path through which the stack gases progress during removal of the gaseous pollutants therefrom, said pollutant removal chamber not including a vertically extending flow path, said defined flow path having a substantially unrestricted cross-sectional flow area to avoid any substantial pressure drop between said inlet and outlet;
   (b) a stack gas inlet at one end of said horizontally extending flow path and a scrubbed stack gas outlet at the opposite end of the horizontally extending flow path, and
   (c) means for introducing a liquid reagent into said flow path to cause said liquid reagent to travel across said flow path and remove pollutants from the stack gases flowing through said chamber without any substantial entrainment of any pollutant laden liquid reagent within the stack gases, and wherein said liquid reagent introducing means includes spraying means for spraying said liquid reagent into said chamber to substantially cover, at least one stage therein, the cross-sectional flow area of said flow path with spray droplets of said liquid reagent which absorb pollutants within the stack gases passing therethrough.

2. The apparatus of claim 1, wherein said spraying means includes a plurality of spray elements spaced along the length of said chamber for spraying said liquid reagent across said chamber to substantially cover at a plurality of stages therein the cross-sectional flow of said flow path with said spray droplets.

3. The apparatus of claim 1, wherein said spraying means sprays said liquid reagent across said chamber substantially perpendicular to said flow path.

4. The apparatus of claim 3, wherein said spraying means sprays liquid reagent substantially vertically downward and across said chamber substantially perpendicular to said horizontally extending flow path.

5. An apparatus for wet scrubbing stack gases, comprising:
   an elongated scrubbing chamber having an inlet at one end thereof for receiving the stack gases, an outlet at said other end for discharging the scrubbed stack gases and sidewall means defining therebetween a substantially horizontally extending flow path for the stack gases passing therethrough with a substantially unrestricted cross-sectional flow area throughout the length thereof to avoid any substantial pressure drop between said inlet and outlet, the elongated scrubbing chamber not including and vertically extending flow path; and at least one spray element for spraying a liquid reagent in the form of spray droplets across said chamber against said sidewall means and in a direction substantially perpendicular to said horizontally extending flow path and thereby substantially cross-current to the flow of stack gases passing therethrough and substantially covering at least one stage between said inlet and said outlet of said cross-sectional flow area with a sheet of said spray droplets through which the stack gases whereby pollutants contained within the stack gases are removed therefrom to said sidewall means by said spray droplets without any substantial entrainment of any pollutant laden liquid reagent within the stack gases.

6. The apparatus of claim 5, wherein at least one spray element is located at the top of said chamber to spray the liquid reagent substantially vertically downward across said chamber.

7. An apparatus for wet scrubbing stack gases to remove therefrom pollutants including gaseous pollutants such as oxides of sulfur and nitrogen, comprising:

(a) a pollutant removal chamber having a stack gas inlet and a scrubbed stack gas outlet and defining therebetween a substantially horizontally extending flow path through which the stack gases progress during removal of the gaseous pollutants therefrom, said defined flow path having a substantially unrestricted cross-sectional flow area to avoid any substantial pressure drop between said inlet and outlet; and (b) means for introducing a liquid reagent into said flow path to cause said liquid reagent to travel across said flow path and remove pollutants from the stack gases flowing through said chamber without any substantial entrainment of any pollutant laden liquid reagent within the stack gases, and wherein said liquid reagent introducing means includes spraying means for spraying said liquid reagent into said chamber to substantially cover, at least at one stage therein, the cross-sectional flow area of said flow path with spray droplets of said liquid reagent which absorb pollutants within the stack gases passing therethrough.

8. The apparatus of claim 7, wherein said spraying means includes a plurality of spray elements spaced along the length of said chamber for spraying said liquid reagent across said chamber to substantially cover at a plurality of stages therein the cross-sectional flow of said flow path with said spray droplets.

9. The apparatus of claim 7, wherein said spraying means sprays said liquid reagent across said chamber substantially perpendicular to said flow path.

10. The apparatus of claim 9, wherein said spraying means sprays said liquid reagent substantially vertically downward and across said chamber substantially perpendicular to said flow path.

11. An apparatus for wet scrubbing stack gases, comprising:

an elongated chamber having an inlet at one end thereof for receiving the stack gases, an outlet at said other end for discharging the scrubbed stack gases and sidewall means defining therebetween a substantially horizontally extending flow path for the stack gases passing therethrough with a substantially unrestricted cross-sectional flow area throughout the length thereof to avoid any substantial pressure drop between said inlet and outlet; and at least one spray element for spraying a liquid reagent in the form of spray droplets across said chamber against said sidewall means and in a direction substantially perpendicular to said flow path and thereby substantially cross-current to the flow of stack gases passing therethrough and substantially covering at least one stage between said inlet and said outlet of said cross-sectional flow area with a sheet of said spray droplets through which the stack gases pass whereby pollutants contained within the stack gases are removed therefrom to said sidewall means by said spray droplets without any substantial entrainment of any pollutant laden liquid reagent within the stack gases.

12. The apparatus of claim 11, wherein at least one spray element is located at the top of said chamber to spray the liquid reagent substantially vertically downward across said chamber.

* * * * *

UNITED STATES PATENT AND TRADEMARK OFFICE
CERTIFICATE OF CORRECTION

PATENT NO. : 4,481,170

DATED : November 6, 1984

INVENTOR(S) : Alexander Weir, Jr.

It is certified that error appears in the above-identified patent and that said Letters Patent is hereby corrected as shown below:

On the title page, Item [75] should read:

--[75] Inventor: Weir, Alexander Jr. --.

Signed and Sealed this

Tenth Day of September 1985

[SEAL]

Attest:

DONALD J. QUIGG

Attesting Officer     Acting Commissioner of Patents and Trademarks - Designate

UNITED STATES PATENT AND TRADEMARK OFFICE
CERTIFICATE OF CORRECTION

PATENT NO. : 4,481,170
DATED : Nov. 6, 1984
INVENTOR(S) : Alexander Weir, Jr.

It is certified that error appears in the above-identified patent and that said Letters Patent is hereby corrected as shown below:

On the title page, Items 19 and 76:

"Wier" should read --Weir--.

This certificate supersedes certificate of correction issued September 10, 1985.

Signed and Sealed this

Third Day of December 1985

[SEAL]

Attest:

DONALD J. QUIGG

Attesting Officer

Commissioner of Patents and Trademarks